INVENTOR.
KEITH R. SCHOLFIELD
ATTORNEYS

June 2, 1953  K. R. SCHOLFIELD  2,640,404
PLOW
Filed Nov. 10, 1947  3 Sheets-Sheet 3

INVENTOR.
KEITH R. SCHOLFIELD
BY
ATTORNEYS

Patented June 2, 1953

2,640,404

UNITED STATES PATENT OFFICE 2,640,404

PLOW

Keith R. Scholfield, East Moline, Ill., assignor to Deere & Company, Moline, Ill., a corporation of Illinois Application November 10, 1947, Serial No. 785,001

16 Claims. (Cl. 97—47.52)

1

The present invention relates generally to agricultural implements and more particularly to implements of the integral or direct connected type, adapted to be mounted on and supported substantially solely by a tractor or other propelling unit.

The object and general nature of the present invention is the provision of a new and improved implement of the tractor mounted type. More particularly, it is an important feature of the present invention to provide a tractor mounted implement that is connected in short coupled relation to the rear of the tractor, whereby the connection of the implement to the tractor and the disconnection of the implement therefrom are materially facilitated, and it is yet a further feature of this invention to provide quick attachable connections further facilitating mounting and dismounting of the implement. It is also an important feature of this invention to provide an implement of this type in which a certain amount of swinging movement of the implement relative to the tractor is accommodated, whereby the outfit may be used readily and efficiently in contour work and the like.

An additional feature of the present invention is the provision of an improved means providing for the lateral adjustment of the implement relative to the tractor so as to accommodate different treads of the tractor, sizes of operating tools, etc., and still further, it is a feature of this invention to provide an improved implement of the ground working type, such as, a plow, wherein the plow is automatically leveled at the different depths of operation.

These and other objects and advantages of the present invention will be apparent to those skilled in the art after a consideration of the following detailed description, taken in conjunction with the accompanying drawings.

Figure 1:
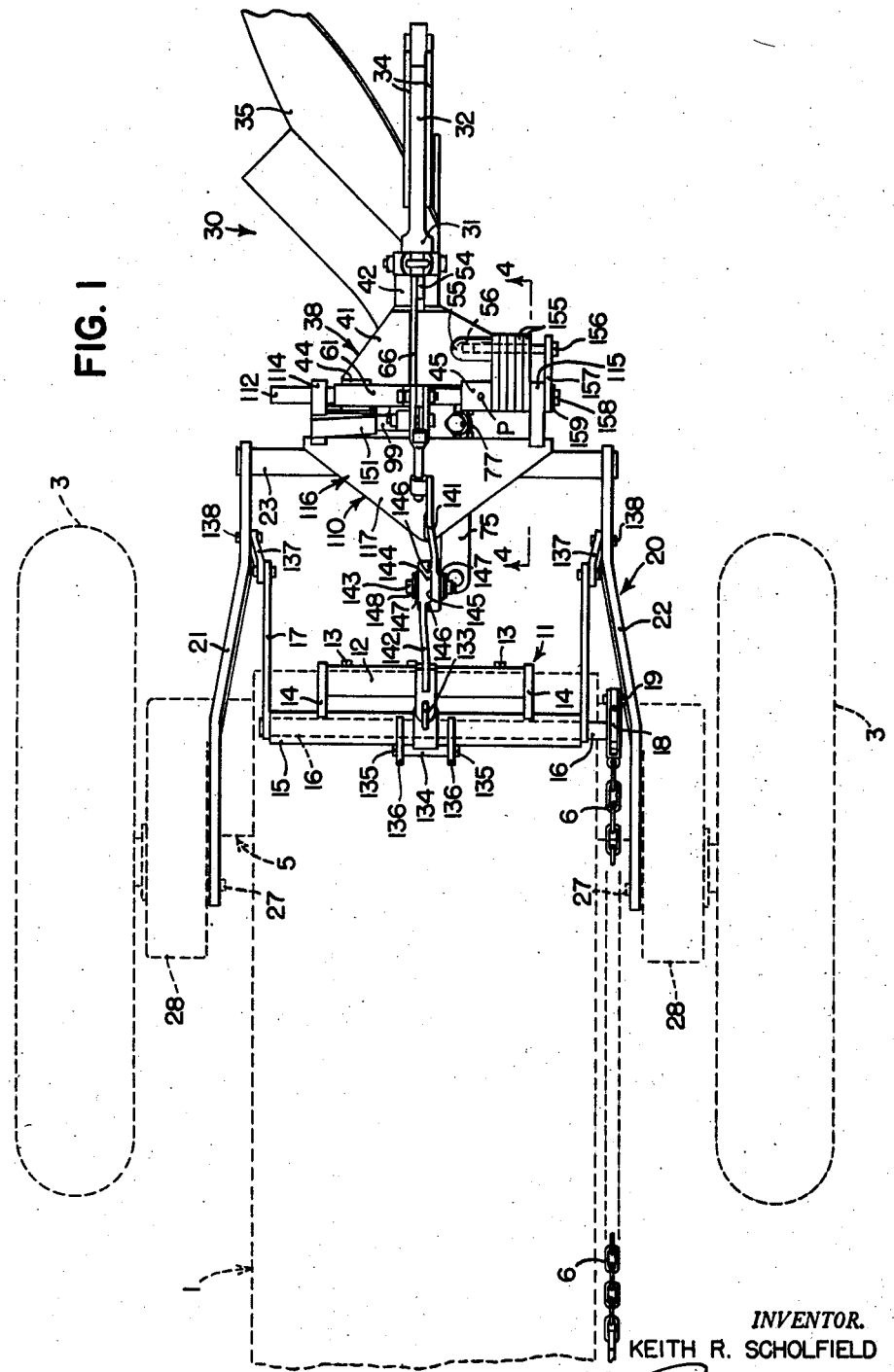
Figure 1 is a plan view of a tractor mounted plow in which the principles of the present invention have been incorporated.

Referring now to the drawings, the tractor, which so far as the present invention is concerned

2 is largely conventional, is indicated in its entirety by the reference numeral 1 and in general includes a main body 2 supported on front wheels (not shown) and rear wheels 3 carried by a rear axle 5. The tractor 1 also includes a power lift unit P of any suitable type connected to raise and lower an implement or implements, and to hold the implement in different positions of adjustment, through an operating link 6.

In order to provide for easy and convenient mounting of an implement on the tractor 1, I provide a tractor-carried supporting framework 11 that is detachably mounted on the tractor but which ordinarily remains as a part of the tractor. The framework 11 includes a transverse supporting angle member 12 having a plurality of openings whereby to receive bolt or stud means 13 by which the angle 12 may be rigidly secured to the rear end of the tractor. Extending upwardly and forwardly from the end portions of the mounting angle 12 are a pair of supporting arms 14 which at their upper ends are welded to a transverse sleeve member 15, the ends of which extend laterally outwardly beyond the supporting arms 14. A transverse rockshaft 16 is mounted for rocking movement in the sleeve member 15 and at its ends carries upwardly and generally rearwardly extending implement controlling arms 17. For operating the rockshaft 16 I provide an operating arm 18 which at its upper end is connected to the link 6 by any suitable means, such as a pivot pin or bolt 19. Thus, fore and aft movement imparted by the link 6 to the arm 18 rocks the shaft 16 in its supporting sleeve 15 and therefore raises and lowers the arms 17.

Normally serving as a part of the tractor 1 is a drawbar structure, indicated in its entirety by the reference numeral 20. The drawbar 20 comprises right and left hand generally L-shaped arms 21 and 22 and a transverse bar 23 rigidly secured, as by welding, to the rear end portions of the arms 21 and 22. An attaching lug 24 is welded to the central portion of the transverse bar 23 and at its forward end carries an aperture 25 to receive a pin 26 or the like by which various implements may be connected to the tractor drawbar 20, usually but not necessarily for generally lateral swinging movement relative thereto. The implement which illustrates the principles of the present invention is adapted to be connected to the tractor drawbar 20 at the point 25 for lateral swinging movement as will be explained below in detail. The front portions of the drawbar arms 21 and 22 extend generally downwardly, the main portions of the arms extending over and rearwardly of the tractor rear axle structure 5. The lower ends of the drawbar arms 21 and 22 are apertured and thus receive drawbar studs 27 which are carried by the tractor rear axle drop housings 28, whereby the drawbar 20 is mounted on the tractor at the rear thereof for generally vertical swinging movement.

The implement which I have chosen to illustrate the principles of the present invention is indicated in its entirety by the reference numeral 30 and comprises a single bottom plow connected to the tractor drawbar 20 in short coupled relation. The plow 30 comprises frame means in the form of a plow beam 31, formed generally as a fore and aft extending shaft member having a rear flattened section 32 to which the upper end of a plow standard 33 is connected, as by a pair of attaching beam brackets 34. The lower end of the standard 33 carries a plow bottom 35 of conventional construction. The forward portion of the plow beam 31 is mounted for rocking movement about a generally fore and aft extending axis in a supporting bracket structure indicated in its entirely by the reference numeral 38. The supporting bracket structure 38, preferably in the form of a casting, comprises a main plate section 41, a generally longitudinally extending sleeve section 42 and a pair of laterally spaced transversely extending short sleeve sections 44 and 45. The plate section 41 is connected rigidly to the longitudinally extending sleeve 42 by reenforcing webs 46 and 47. The bracket member 38 also includes an upstanding strut portion 51 and a lateral extension 52 which is joined to the right hand short sleeve section 44. The rear portion of the sleeve section 42 includes an upwardly extending apertured lug 54, and forwardly thereof the bracket member 38 is provided with an apertured boss section 55 (Figure 1) which is drilled and tapped, as at 56. Similarly, the lateral extension portion 52 is also provided with a boss portion 58 that is drilled and tapped so as to receive a threaded stud 59. The latter member serves to secure a laterally inwardly and upwardly extending brace strap 61, the upper end of which is connected by a transverse bolt 62 to a vertically extending bracket member 63, the lower end of which is secured by bolts 64 to the forward portion of the strut section 51. A rear diagonal brace 66 is connected at its upper end to the members 61 and 63 by the bolt 62 and at its lower end is connected by a bolt 67 to the lug 54 of the casting member 41. Thus, the bracket structure 38 just described is a rigid part and receives the front portion of the plow beam 31 for limited rocking movement therein.

The beam 31 is held against rearward displacement relative to the bracket section 38 by means of a colter clamp unit indicated in its entirety by the reference numeral 70. The colter itself is of generally conventional construction, including a colter disk 71 mounted for rotation in a colter shank 72 which at its forward end is connected by suitable clamping means 73 to a short shaft 74 carried in a downwardly and forwardly extending bar 75. The upper or rear end of the bar 75 is welded or otherwise firmly fixed to a vertical shank 76 having a keyway or groove 77 therein.

The colter clamp unit 70 comprises three members 81, 82 and 83. The clamping member 81 has a first socket section 86 so as to fit against the front end of the plow beam 31, and this section 86 is formed with a groove 87 therein to receive the heads of a pair of bolts 88 by which the member 82 is connected to the member 81. The latter has a colter shank receiving groove 91 disposed generally between the bolts 88, and the cap 82 is provided with a rib 92 to seat in the groove 77 in the colter shank 76. The member 81 is also provided with a pin 94 extending into the semi-cylindrical shaft-receiving groove 87, the plow beam 31 having an opening 95 to receive the pin 94. The member 81 is clamped to the front end of the plow beam 31 by the clamping member 83. The latter member includes apertured ears 97 and a semi-cylindrical shaft-receiving section 98, together with a laterally outwardly directed arm extension 99. A pair of bolts 101 extend through the lugs 97 and through apertured lugs 102 formed on the member 81, and tightening the bolts 101 effectively secures these members to the front end of the plow beam 31, with the pin 94 disposed in the beam opening 95. The bolts 88, the heads of which nest in the transverse groove 87 so as not to interfere with the clamping of the member 81 against the beam 31, extend laterally outwardly and receive the clamping cap member 82.

It will be noted that the pin 94 locates the clamping member 81 with respect to the plow beam 31 and that the rib 92 on the clamping member 82 locates the upper end of the colter bracket 76 relative to the clamping unit 70. The parts are so arranged that the colter bracket shank 76 is always disposed with its axis extending generally vertically in or adjacent the plane of the landside of the plow bottom 35, but by loosening one of the bolts 88 and tightening the other, the cap member 82 may, within limits, be readjusted to turn the colter bracket shank 76 about its generally vertical axis, thus shifting the front end of the colter bracket 75 laterally toward the right or left so as to dispose the colter 71 in the proper position relative to the plow point. Similarly, the position of the arm 99 relative to the plow beam 31 may be varied by loosening one of the bolts 101 and tightening the other. The arm 99 forms a part of the means providing for automatically leveling the plow bottom 35 in its different depths of operation and such means will be described later.

Figure 4:
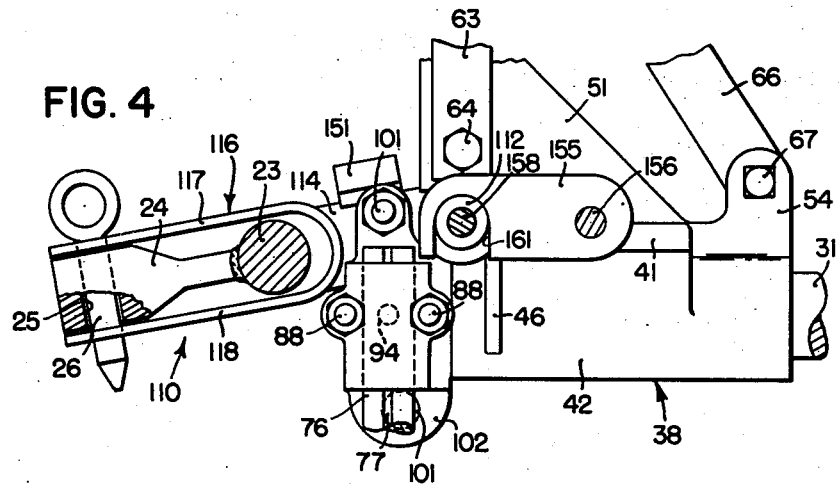
Figure 4 is a sectional view taken generally along the line 4—4 of Figure 1.
Figure 5:
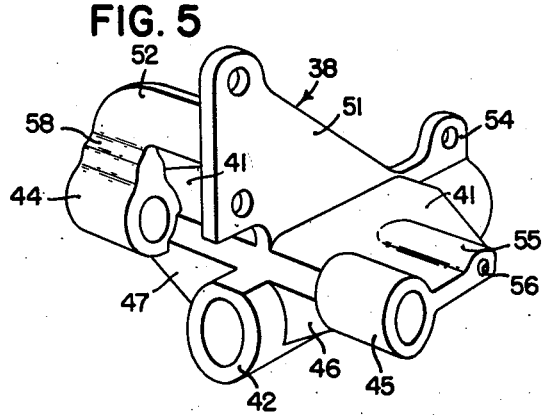
Figure 5 is a perspective view of the bracket that forms a part of the means that rockably connects the plow beam to the tractor drawbar.

The bracket structure 38 is adapted to be connected with the tractor drawbar 20 by quick detachable means that is indicated in its entirety by the reference numeral 110. The short sleeve sections 44 and 45 of the bracket casting 41 receive a cross shaft 112 which is fixed therein, as by a pin P or the like (Figure 1). The shaft 112 is slidably mounted in the rear apertured ends of a pair of forwardly extending lugs 114 and 115 that are welded to the rear portion of a forwardly extending attaching member in the form of a saddle 116 having upper and lower generally triangular sections 117 and 118 forming therebetween a socket to receive the cross member 23 of the tractor drawbar 20. The member 116 engages the upper and lower sides of the cross member 23 along the length of the latter, as will be seen from Figures 1 and 4, and thus contacting the bar 23 at laterally spaced apart points the member 116 is held against tilting movement relative to the bar 23 about a generally longitudinally extending axis. The shaft 112 and associated parts form transverse hinge means connecting the forward portion of the implement frame means with the attaching member 116 which swings bodily with the tractor drawbar 20. The forward portions of the upper and lower saddle member sections 117 and 118 are apertured to receive the draft pin 26 that is insertable through the opening 25 in the draft lug 24 formed on the tractor drawbar 20. The saddle member 116 is dimensioned so that when the pin 26 is in place the saddle member 116 may swing laterally relative to the tractor drawbar through a limited extent, and hence the plow bottom 35 and associated frame structure may also swing laterally relative to the tractor, the plow beam hingedly connected with the saddle member 116 through the shaft 112 whereby the plow bottom is held against movement about a fore and aft extending axis except as permitted by the movement of the plow beam 31 in the bracket sleeve 42.

The member 63 of the bracket structure 38 extends upwardly and receives a pivot pin 125 by which a swivel member 126 is connected therewith for generally vertical movement relative thereto, and the forward portion of the swivel member 126 is bifurcated so as to form two vertically spaced sections 127 and 128 which are apertured to receive a vertical pivot pin 129 by which the rear end of a link member, indicated in its entirety by the reference numeral 130, is connected therewith for lateral movement with respect thereto. The forward end of the link member 130 includes a bifurcated attaching section 132 apertured to receive a quick detachable pin 133 by which the front portion of the link member 130 may be connected with a pivot block 134 supported for rocking movement by laterally directed trunnions 135 in a pair of apertured lugs 136 fixedly attached to the central portion of the sleeve member 15 on the tractor. It will be noted that in operation the link member 130 is stressed in compression while the tractor drawbar 20 is stressed largely in tension, and the plow may be raised and lowered by virtue of a pair of links 137 that are pivotally connected at their upper ends to the lift arms 17 and at their lower ends are pivotally connected to the side arms 21 and 22 of the tractor drawbar 20 by pivot studs 138.

Figure 2:
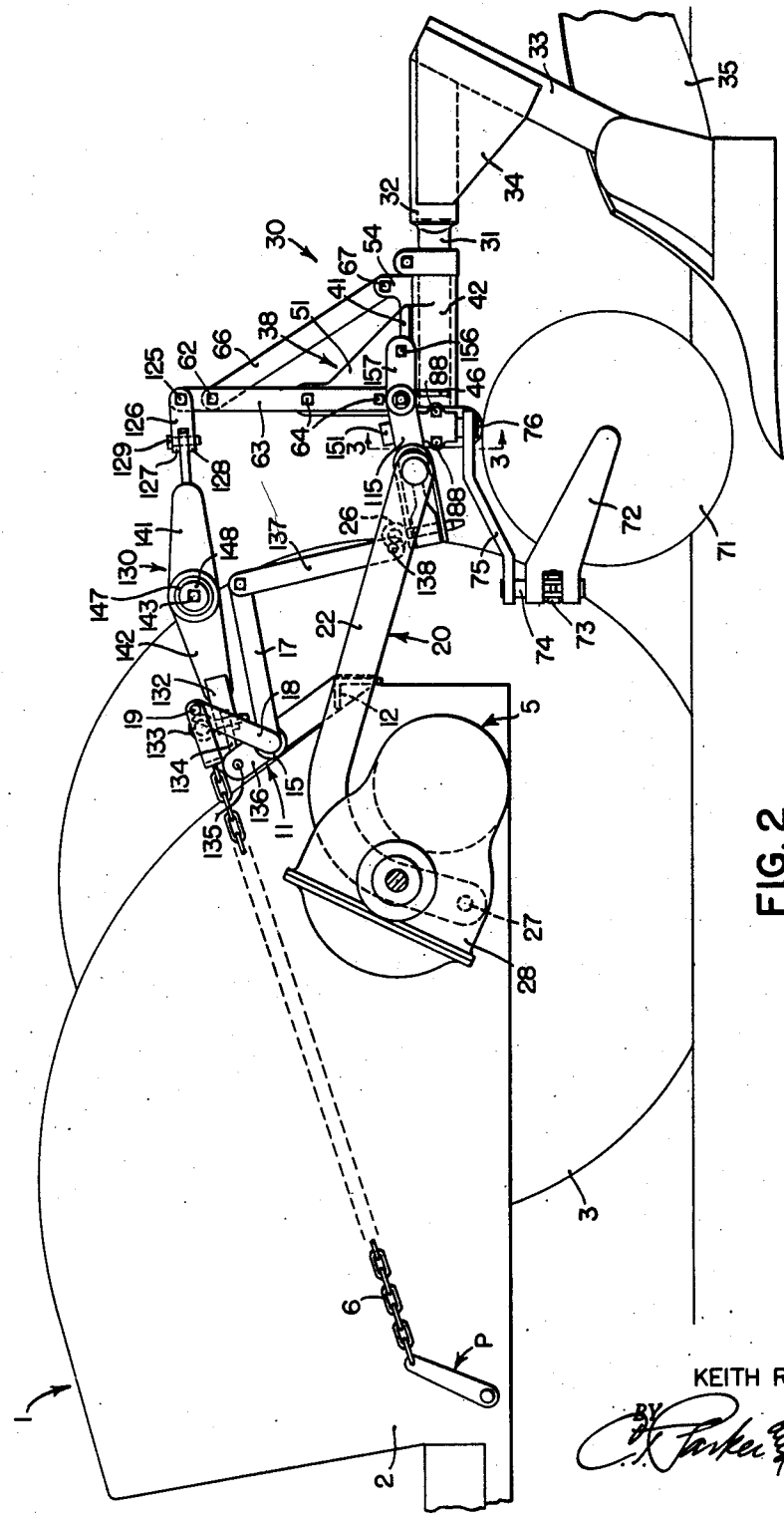
Figure 2 is a side view of the plow shown in Figure 1.
Figure 3:
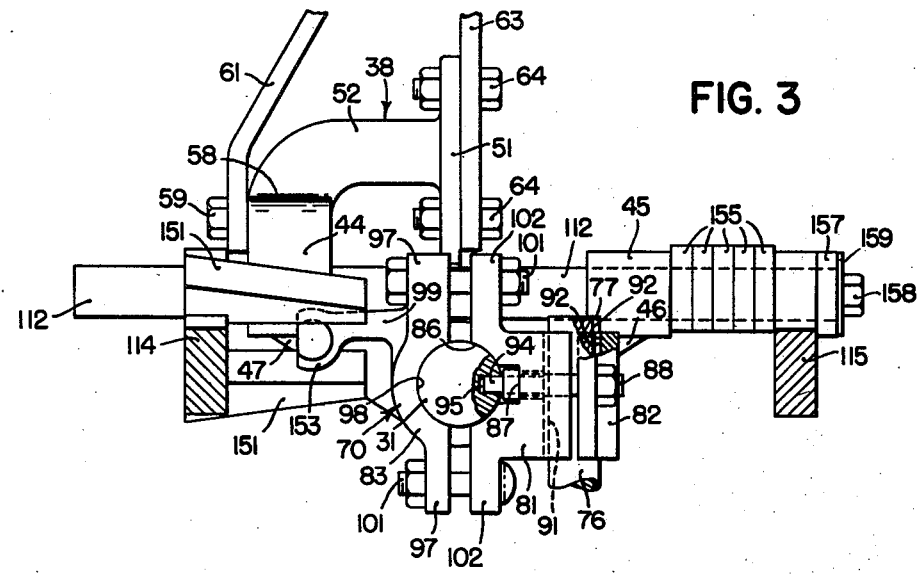
Figure 3 is a sectional view taken generally along the line 3—3 of Figure 2.

The link member 130 preferably is made so as to incorporate therein an overload release unit, and to this end the link member 130 comprises two arm sections 141 and 142 pivotally interconnected together by a transverse pivot bolt 143. The inner end of each of the link members 141 and 142 is formed with arcuate cam sections in the form of lugs 144 and sockets 145 interconnected by angled cam edges 146. As best shown in Figure 1, the lugs on one link member normally interlock with the sockets on the other member, and the parts are held in this normally interlocked relation by virtue of a pair of resilient members 147, preferably formed of rubber or rubber-like material, which are clamped underneath clamping washers 148 and held in tightly clamped relation by the pivot bolt 143. As best shown in Figure 2, the arms and link members 141 and 142 are arranged so that the pivot pin 143 lies slightly above the line connecting the pivots 125 and 135 between the link member 130 and the plow bracket and tractor support, respectively. However, if the plow bottom should engage under a stone, strike a stump or other obstruction, or otherwise be subjected to an overload, the links 141, 142 will break or buckle upwardly permitting the plow bottom to swing away from the obstruction.

In order to have the plow bottom of an integral plow operate in a level position at different depths of operation while the tractor is operated with one rear wheel in the furrow and one wheel on the land, it is usually necessary to provide some means for adjusting the position of the plow bottom relative to the tractor about a generally fore and aft extending axis. This action is accomplished automatically, according to the principles of the present invention, by virtue of the angling arm 99 on the colter clamping member 83 and a pair of cooperating arms 151, secured, as by welding, to the lug 114 on the saddle member 116. It will be noted that the two arms 151 have their ends disposed on opposite sides of a ball shaped section 153 formed on the outer end of the arm 99 and that the arms 151 are disposed forward of the axis, defined by the shaft 112, about which the plow as a unit hinges or pivots with respect to the saddle member 116 when the tractor drawbar 20 is raised and lowered. The action of these parts is such that when the drawbar 20 of the tractor is moved downwardly, so as to cause the plow bottom to operate at an increased depth, the arms 151 act against the arm 99 so as to swing the plow beam 31 in the sleeve 42 in a counterclockwise direction, looking at the outfit from the rear, thus swinging the plow bottom 35 into such position that when the right hand wheel of the tractor operates in the furrow at the new depth the plow bottom will operate in a level position. The converse is true if, for example, the drawbar 20 is raised to decrease the depth of operation of the plow, and when the drawbar 20 is raised into its uppermost position for transport, the plow bottom 35 is swung laterally inwardly toward a central position behind the tractor.

The plow may be adjusted laterally relative to the tractor by shifting the bracket structure 38 laterally along the shaft 112, and in order to maintain the desired lateral adjustment, I have provided a plurality of abutment links 155 pivotally mounted on a stud bolt 156 threaded into the apertured and tapped boss 55 on the bracket casting 41. The outer end of the bolt 156 receives a spacing link 157 which is disposed on the outer end of the shaft 112 that is fixed to one or the other of the short sleeve sections 114, 115 so as to be movable with the plow relative to the saddle member 116 and associated parts. Preferably, the outer end of the shaft 112 is tapped to receive a stud 158. A washer 159 is disposed between the head of the stud 158 and the forward end of the link 157. The forward end of each of the abutment links 155 is formed with a notch 161 whereby the links 155 may be swung upwardly or downwardly away from or toward the shaft 112 and may be disposed on one or the other of the sides of the lug 115, thereby cooperating with the lug 115 to maintain the plow in its position of lateral adjustment. If, for example, all of the abutment links 155 were disposed on the inside of the lug 115, the plow is at its laterally outer limit of adjustment, as shown in Figure 1. If it should be desired to move the plow laterally inwardly, as to increase the width of plowing, one or more of the links 155 may be raised away from the shaft 112, the plow shifted laterally relative to the saddle member 116 and the links 155 then dropped down onto the shaft 112 between the lug 115 and the outer link 157.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. The combination with a tractor having a hitch member that is laterally and torsionally rigid and is connected with the tractor for generally vertical swinging movement, said hitch member including a traverse bar of a plowing unit, means for connecting said plowing unit with said hitch member for movement relative thereto about a generally extending fore and aft axis and a generally transverse axis, said means including a bar-receiving member adapted to snugly receive said bar so as to be constrained to swing generally vertically therewith, a plow supporting structure pivotally connected with said bar-receiving member for movement relative thereto about a generally transverse axis, and frame means swingably connected with said supporting structure for movement relative to the latter about a generally fore-and-aft extending axis, a first part rigidly connected with said bar-receiving member at a point spaced from said transverse axis, a second part fixed with respect to said frame means and disposed adjacent said first part, and interconnecting means acting between said parts whereby movement of said supporting structure relative to said bar-receiving member about said transverse axis acts to rock said frame means about said fore-and-aft extending axis, whereby when the plowing unit moves about said transverse axis relative to said hitch member, said unit is automatically shifted about said fore and aft extending axis, for leveling the plowing unit at different depths of operation.

2. The combination with a tractor having a hitch member that is laterally and torsionally rigid but connected with the tractor for generally vertical swinging movement, of a plowing unit, means for connecting said plowing unit with said hitch member for movement relative thereto about a generally fore and aft extending axis and a generally transverse axis, means swingable vertically with said hitch member and extending alongside said plowing unit to a point spaced fore and aft from said transverse axis, and means on said unit engageable by said swingable means for turning said plowing unit about said last mentioned axis in response to vertical swinging of said hitch member about said transverse axis relative to said plowing unit, for leveling the plowing unit at different depths of operation.

3. An integral plow adapted to be connected to a tractor having a generally laterally rigid vertically swingable drawbar, the latter including a pair of generally vertically swingable side arms and a rear transverse bar rigidly fixed at its ends to the rear portions of said arms, a plow beam, means for connecting said beam with said transverse bar, including an attaching structure pivotally connected with said transverse bar for pivotal movement relative thereto about a generally vertically extending axis disposed relatively closely adjacent said transverse bar, a plow bottom fixed to said plow beam, a link disposed above said drawbar and connected at its forward end to react against the tractor, means pivotally connecting the rear end of said link with said attaching structure for movement with respect thereto about both vertical and horizontal axes, and means connected with the drawbar for raising and lowering the latter and thereby raising and lowering said plow bottom.

4. An implement adapted for use with a tractor having a generally vertically swingable draft-transmitting means and a generally fore-and-aft extending thrust link disposed above said draft-transmitting means and swingably connected at its forward end with the tractor, said implement comprising a plow beam, an attaching structure in which said plow beam is rockably mounted for movement relative to said structure about a generally fore-and-aft extending axis, said attaching structure adapted to be pivotally connected with said draft-transmitting means for pivoting movement relative thereto about a generally transverse axis, means for pivotally connecting the upper portion of said attaching structure with said thrust link, a plow bottom fixed to said plow beam, a part connected to pivot relative to said attaching structure when said draft-transmitting means swings relative to said attaching structure, a part fixed to said beam and engageable with said first mentioned part, whereby when said attaching structure pivots relative to said draft-transmitting means, said plow beam is rocked about said fore-and-aft extending axis relative to said attaching structure, and means for raising and lowering said drawbar for raising and lowering said plow bottom.

5. The combination with a tractor having a rear drawbar swingable generally vertically and including a transverse section, of an agricultural implement unit including ground working means, an attachment member pivotally connected with said unit for movement relative thereto about a generally transverse axis, said attachment member comprising means embracing the transverse section of said tractor drawbar at laterally spaced apart points so as to hold said unit against movement relative thereto about a generally longitudinally extending axis and means pivotally connecting the attachment member with the drawbar so as to provide for lateral movement of said attachment member relative to the tractor drawbar about a generally upwardly extending axis, an upwardly extending bracket carried by said unit, and a compression-resisting link operatively connected at one end with the upper portion of said bracket and adapted to be connected at its other end with the tractor.

6. The combination set forth in claim 5, further characterized by means for connecting said one end of said link and the upper portion of said bracket, said means including parts accommodating relative movement about a generally vertical axis adjacent the vertical axis about which said attachment member has movement relative to the tractor drawbar.

7. The combination set forth in claim 5, further characterized by means for connecting one end of said link with the upper portion of said bracket, and means for connecting the other end of said link with said tractor for lateral swinging movement relative thereto.

8. The invention set forth in claim 5, further characterized by a generally vertical pivot pin connecting said attachment member with the tractor drawbar and a generally vertical pivot pin connecting the forward end of said link with the tractor, both of said pins being readily detachable.

9. The combination with a tractor having a generally vertically swingable drawbar, of an implement attachment comprising a part pivotally connected with said drawbar for movement relative thereto about two angularly related axes, a member, means for connecting said member with said drawbar to swing therewith relative to said part when the drawbar is swung relative to the tractor, an arm fixed to said part and extending generally at right angles to one of said axes, and cooperating arm means on said member engagable with said first mentioned arm for swinging said part about said one axis.

10. In an agricultural implement, a generally vertically swingable raising and lowering member, a bracket hingedly connected therewith for movement about a transverse axis and including a generally fore-and-aft extending sleeve section, a plow beam rockably mounted in said sleeve section for movement about a fore and aft extending axis, and interengaging arms fixedly connected to said beam and said member, respectively, said arms being spaced, respectively, from said transverse and fore-and-aft extending axes, for rocking said beam by movement of said member relative to said bracket.

11. In an agricultural implement, a generally vertically swingable raising and lowering member, a bracket hingedly connected therewith for movement about a transverse axis, a sleeve fixed to said bracket and extending in a generally fore and aft direction, a plow beam rockably mounted in said sleeve, an arm fixed to the front end of said plow beam and extending generally radially outwardly relative to the axis of rocking of said plow beam in said sleeve, and means fixed to said raising and lowering member at a point spaced from said transverse axis and engageable with said arm for rocking the plow beam in said sleeve when said raising and lowering member is shifted about said transverse axis relative to said bracket.

12. The invention set forth in claim 11, further characterized by a colter bracket fixed to the front end of said plow beam, a colter carried in said colter bracket, a plow bottom fixed to the rear end of said plow beam in fixed relation with respect to said colter, said arm being adjustably mounted on said colter bracket.

13. For use with a tractor having a hitch that is laterally and torsionally rigid but connected with the tractor for generally vertical swinging movement, the improvement which includes an agricultural implement connectible with said hitch and comprising frame means, an attaching member having a forwardly facing socket, pivot means for connecting said attaching member with said hitch for movement relative thereto about a generally vertical axis, the socket of said attaching member being adapted to snugly receive the rear portion of said hitch whereby said attaching member is bodily swingable with said hitch, transverse hinge means connecting said implement frame means with said attaching member, an upwardly extending bracket fixed to said implement frame means, a rigid compression-resisting link adapted to be connected at its forward end with the tractor, and pivot means connecting the rear end of said link with the upper portion of said bracket for relative movement between the bracket and link about generally transverse and vertical axes, the generally transverse axis being substantially parallel to the axis of said transverse hinge means and the last mentioned vertical axis lying adjacent said first-mentioned vertical axis.

14. An agricultural implement as defined in claim 13, further characterized by means acting between said frame means and said attaching member for holding said frame means in different positions of lateral adjustment along the axis of said hinge means.

15. An agricultural implement as defined in claim 14, further characterized by said frame means including a generally fore and aft extending part shiftable relative to the frame means about a generally fore and aft extending axis, and means connected to move with said attaching member and acting against said part for shifting the latter about said last-mentioned axis.

16. For use with a tractor having a lower draft means that is connected with the tractor for generally vertical swinging movement and an upper compression link also connected with the tractor at its forward end for generally vertical swinging movement, an agricultural implement connectible with said draft-transmitting means and said compression link, said implement comprising a generally vertically extending attaching structure, means pivotally connecting the rear portions of said draft-transmitting means with the lower portions of said attaching structure, means pivotally connecting the rear portion of said upper compression link member with the upper portion of said attaching structure, means on the lower portion of said attaching structure forming a generally fore-and-aft extending sleeve section, a beam member mounted for rocking movement in said sleeve section and extending in a generally fore-and-aft direction, a ground-working tool fixed to the rear portion of said beam member, an arm fixed to the forward portion of said beam member, a second arm engageable with said first arm and movable relative to said attaching structure, and means for connecting said arm with said draft-transmitting means so as to be swingable vertically therewith, said last-mentioned arm engaging said first arm so as to rock said beam about a fore-and-aft extending axis in response to swinging movement of said draft-transmitting means relative to said attaching structure.

KEITH R. SCHOLFIELD.

References Cited in the file of this patent

UNITED STATES PATENTS

| Number | Name | Date |
|---|---|---|
| 1,366,842 | Smith | Jan. 25, 1921 |
| 1,688,615 | Daniel | Oct. 23, 1928 |
| 1,807,731 | Ehricke | June 2, 1931 |
| 1,864,639 | Crezee | June 28, 1932 |
| 1,980,470 | Brown | Nov. 13, 1934 |
| 2,249,861 | Silver | July 22, 1941 |
| 2,302,502 | Morkoski et al. | Nov. 17, 1942 |
| 2,319,670 | Ego | May 18, 1943 |
| 2,345,741 | Foulke | Apr. 4, 1944 |
| 2,351,473 | Benjamin | June 13, 1944 |
| 2,379,225 | Fraga | June 26, 1945 |
| 2,398,147 | McKay | Apr. 9, 1946 |
| 2,438,553 | Fraga | Mar. 30, 1948 |
| 2,567,736 | Silver | Sept. 11, 1951 |

FOREIGN PATENTS

| Number | Country | Date |
|---|---|---|
| 628,907 | Great Britain | Sept. 7, 1949 |